US010284282B2

(12) United States Patent
Brownjohn et al.

(10) Patent No.: US 10,284,282 B2
(45) Date of Patent: May 7, 2019

(54) WIRELESS AIRCRAFT NETWORK AND METHOD FOR WIRELESSLY CONNECTING AIRCRAFT IN A NETWORK

(71) Applicant: Airbus Operations GmbH, Hamburg (DE)

(72) Inventors: Nicholas E. Brownjohn, Hamburg (DE); Stéphane Poulain, Hamburg (DE); Sven Knefelkamp, Wedel (DE); Igor Ibáñez Martin, Hamburg (DE)

(73) Assignee: Airbus Operations GmbH (DE)

( * ) Notice: Subject to any disclaimer, the term of this patent is extended or adjusted under 35 U.S.C. 154(b) by 224 days.

(21) Appl. No.: 14/819,713

(22) Filed: Aug. 6, 2015

(65) Prior Publication Data

US 2016/0050013 A1    Feb. 18, 2016

(30) Foreign Application Priority Data

Aug. 12, 2014  (EP) .................... 14180661

(51) Int. Cl.
*H04B 7/185* (2006.01)
*H04W 4/02* (2018.01)
(Continued)

(52) U.S. Cl.
CPC ..... *H04B 7/18506* (2013.01); *H04B 7/18508* (2013.01); *H04W 4/021* (2013.01); *H04W 84/18* (2013.01)

(58) Field of Classification Search
CPC ............ H04B 7/18506; H04B 7/18508; H04B 7/18502; H04B 10/1123; H04W 84/18;
(Continued)

(56) References Cited

U.S. PATENT DOCUMENTS

| 7,085,562 B1 | 8/2006 | Holder et al. |
| 2005/0232185 A1 | 10/2005 | Hudson et al. |

(Continued)

FOREIGN PATENT DOCUMENTS

| CA | 2 478 693 A1 | 2/2005 |
| EP | 2 086 279 A1 | 8/2009 |
| EP | 2 237 504 A1 | 10/2010 |

OTHER PUBLICATIONS

EP 14 18 0661 search report dated Feb. 9, 2015.
(Continued)

*Primary Examiner* — Timothy J Weidner
*Assistant Examiner* — Debebe A Asefa
(74) *Attorney, Agent, or Firm* — Lerner, David, Littenberg, Krumholz & Mentlik, LLP

(57) ABSTRACT

A wireless aircraft network includes a plurality of aircrafts having transceiver devices for transceiving wireless communication, a plurality of ground-based network stations having transceiver devices for transceiving wireless communication, and a network operator station configured to store location data regarding the current geographical location of the plurality of aircrafts in a location data table of the network operator station and to determine a most efficient network path for each of the plurality of aircrafts to one of a plurality of ground-based network stations depending on the current geographical location of the plurality of aircrafts and the geographical location of the plurality of ground-based network stations.

12 Claims, 1 Drawing Sheet

(51) Int. Cl.
*H04W 4/18* (2009.01)
*H04W 4/021* (2018.01)
*H04W 84/18* (2009.01)

(58) Field of Classification Search
CPC ..... H04W 40/20; H04W 8/005; H04W 84/06;
H04Q 11/0062; H04Q 11/0067; H04Q
2011/0088
See application file for complete search history.

(56) References Cited

U.S. PATENT DOCUMENTS

| | | | | |
|---|---|---|---|---|
| 2009/0103473 | A1* | 4/2009 | Foster | H04B 7/18584 370/316 |
| 2009/0141669 | A1* | 6/2009 | Kauffman | H04W 40/246 370/328 |
| 2009/0186611 | A1* | 7/2009 | Stiles | H04B 7/18506 455/431 |

OTHER PUBLICATIONS

Vivek, K.; Rana, A.; Kumar, S.: "Aircraft Ad-hoc Network (AANET)", International Journal of Advanced Research in Computer and Communication Engineering, vol. 3(5), p. 6679-6684, May 2014.

* cited by examiner

WIRELESS AIRCRAFT NETWORK AND METHOD FOR WIRELESSLY CONNECTING AIRCRAFT IN A NETWORK

TECHNICAL FIELD

The present invention relates to a wireless aircraft network and a method for wirelessly connecting aircraft in a network, particularly ad-hoc networks with aircraft as mobile network nodes.

BACKGROUND OF THE INVENTION

Airlines have explored the potential for aircraft and flight crews exchanging data in real time with ground base staff and systems to enhance operational efficiency and safety of flight. In order to provide for updates on the meteorological conditions over the flight route, the varying performance of aircraft systems, changing air traffic control restrictions and/or opportunities, some form of communication between the aircraft and ground has to be implemented.

Communication between an aircraft and communication transceivers external to the aircraft, such as satellites, ground stations or towers, is facilitated by means of wireless communication terminals having an antenna and a transceiving modulator/demodulator on-board of the aircraft. With the aircraft in flight, a complex network infrastructure of spatially spread ground stations and/or satellites is a prerequisite for obtaining good communication coverage. The higher the desired coverage of possible aircraft flight paths is, the more network infrastructure needs to be provided.

A possible approach for facilitation inter-aircraft (A2A) and ground-to-aircraft (G2A) communication is the use of aircraft ad-hoc networks: Self-organizing networks where aircraft work as mobile nodes of the network. Ad-hoc networks are dynamic networks that may be created anywhere with just two nodes capable of ad-hoc networking that do not necessarily require a centralized infrastructure. Such ad-hoc networks for aircraft are for example described in Vivek, K.; Rana, A.; Kumar, S.: "Aircraft Ad-hoc Network (AANET)", International Journal of Advanced Research in Computer and Communication Engineering, vol. 3(5), p. 6679-6684, May 2014, or U.S. Pat. No. 7,085,562 B1 which discloses an airborne telecommunications network that uses airborne aircraft to route message traffic between a source and destination.

However, there is a need for wireless aircraft networks which are able to operate more reliably and efficiently.

BRIEF SUMMARY OF THE INVENTION

One idea of the invention is thus to provide solutions for managing wireless communication between aircraft and ground stations which provide broad spatial coverage, high robustness and availability, and improved quality of service at lower bandwidth cost.

A first aspect of the disclosure pertains to a wireless aircraft network, comprising a plurality of aircraft having transceiver devices for transceiving wireless communication, a plurality of ground-based network stations having transceiver devices for transceiving wireless communication, and a network operator station configured to store location data regarding the current geographical location of the plurality of aircraft in a location data table of the network operator station and to determine a most efficient network path for each of the plurality of aircraft to one of a plurality of ground-based network stations depending on the current geographical location of the plurality of aircraft and the geographical location of the plurality of ground-based network stations.

According to a second aspect of the disclosure, a method for wirelessly connecting aircraft comprises receiving location data regarding the current geographical location of a plurality of aircraft in a network operator station; updating a location data table of the network operator station according to the received location data; reading out the current geographical locations of the plurality of aircraft from the location data table and determining a most efficient path for each of the plurality of aircraft to one of a plurality of ground-based network stations depending on the read out current geographical locations of the plurality of aircraft and the geographical locations of the plurality of ground-based network stations in the network operator station; providing the determined most efficient paths to each of the plurality of aircraft as route discovery information for an aircraft ad-hoc network; and connecting one or more of the plurality of aircraft in an aircraft ad-hoc network according to the provided route discovery information.

According to a third aspect of the disclosure, a network operator station for an aircraft ad-hoc network comprises a location management module configured to receive location data regarding the current geographical location of a plurality of aircraft and to update a location data table according to the received location data, and a control module configured to read out the current geographical locations of the plurality of aircraft from the location data table, to determine a most efficient path for each of the plurality of aircraft to one of a plurality of ground-based network stations depending on the read out current geographical locations of the plurality of aircraft and the geographical locations of the plurality of ground-based network stations, and to provide the determined most efficient paths to each of the plurality of aircraft as route discovery information for the aircraft ad-hoc network.

According to an embodiment of the wireless aircraft network, the network operator station may further be configured to provide the determined most efficient paths to each of the plurality of aircraft as route discovery information.

According to another embodiment of the wireless aircraft network, the plurality of aircraft may be configured to connect to other aircraft and/or the plurality of ground-based network stations according to the provided route discovery information.

According to another embodiment of the wireless aircraft network, the wireless aircraft network may further comprise one or more satellites configured to provide satellite communication between the plurality of aircraft and the ground-based network stations.

According to another embodiment of the wireless aircraft network, the ground-based network stations may comprise one or more seaborne vessels.

According to an embodiment of the method, the method may further comprise scheduling the transmission of aircraft related communication items depending on the provided route discovery information.

In this regard, according to a further embodiment of the method, if it is determined that there is currently no path between one of the plurality of aircraft and one of the ground-based network stations, the transmission of aircraft related communication items may be scheduled to be withheld until it is determined that a path between the respective aircraft and the respective ground-based network station is available.

In an alternative embodiment of the method, if it is determined that there is currently no path between one of the plurality of aircraft and one of the ground-based network stations, only transmission of mission-critical aircraft related communication items may be scheduled to be performed over satellite communication.

According to an embodiment of the network operator station, the network operator station may be configured to determine and provide the most efficient paths according to the location-aided routing protocol (LAR), the optimized link state routing protocol (OLSR), the ad-hoc on demand distance vector routing protocol (AODV), the temporally-ordered routing algorithm (TORA), or the zone routing protocol (ZRP).

According to another embodiment of the network operator station, the network operator station may further comprise a transceiver module configured to wirelessly transmit the route discovery information to one or more of the plurality of aircraft.

According to another embodiment of the network operator station, the network operator station may be connectable to one or more ground stations via a wirebound ground link, and the control module may be configured to provide the determined most efficient paths to the one or more ground stations as route discovery information for the aircraft ad-hoc network.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
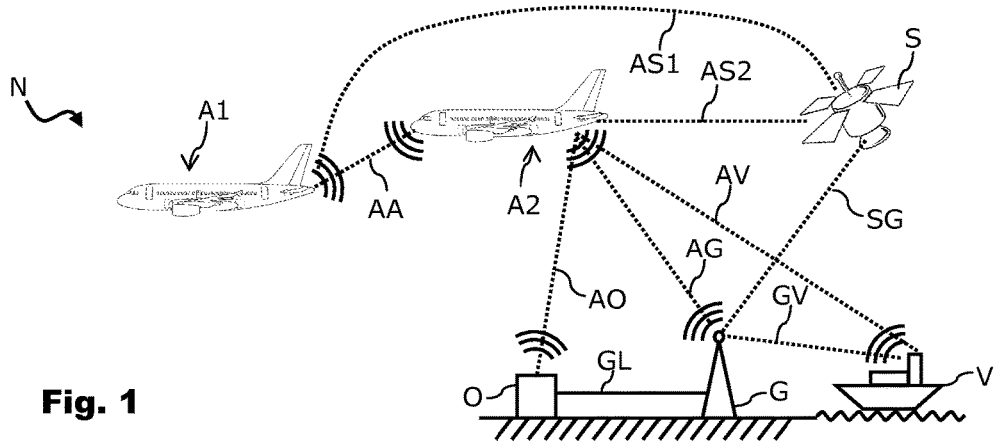
FIG. 1 schematically illustrates a wireless aircraft network according to an embodiment.

FIG. 1 shows a schematic illustration of a wireless aircraft network N. A plurality of aircraft (of which only two referenced to as A1 and A2 are depicted herein for reasons of lucidity) have transceiver devices for transceiving wireless communication. Similarly, a plurality of ground-based network stations, such as a base station G or a seaborne vessel V, both having transceiver devices for transceiving wireless communication may take part in the network N. Moreover, the network N may comprise one or more satellites S configured to provide satellite communication between the plurality of aircraft A1, A2 and the ground-based network stations G, V. The number of aircraft and ground-based network stations is of course not limited to two, in each case, but may be any number higher than two as suitable for the respective purpose and situation.

The network N further comprises a network operator station O configured to store location data DL regarding the current geographical location of the plurality of aircraft A1, A2 in a location data table of the network operator station O and to determine a most efficient network path for each of the plurality of aircraft A1, A2 to one of the plurality of ground-based network stations G, V depending on the current geographical location of the plurality of aircraft A1, A2 and the geographical location of the plurality of ground-based network stations G, V.

In order to build up the ad-hoc aircraft network N, the various network nodes may temporarily implement several wireless communication links: aircraft-to-aircraft links AA, aircraft-to-ground links AG, aircraft-to-operator links AO, aircraft-to-satellite links AS1 and AS2, and aircraft-to-vessel links AV. The satellites S may be connected to the ground stations G via a satellite-to-ground link SG, while the seaborne vessels V may be connected to the ground stations G via a ground-to-vessel link GV. Moreover, the operator station O may be connected to the ground station(s) G via one or more wirebound links GL.

Figure 2:
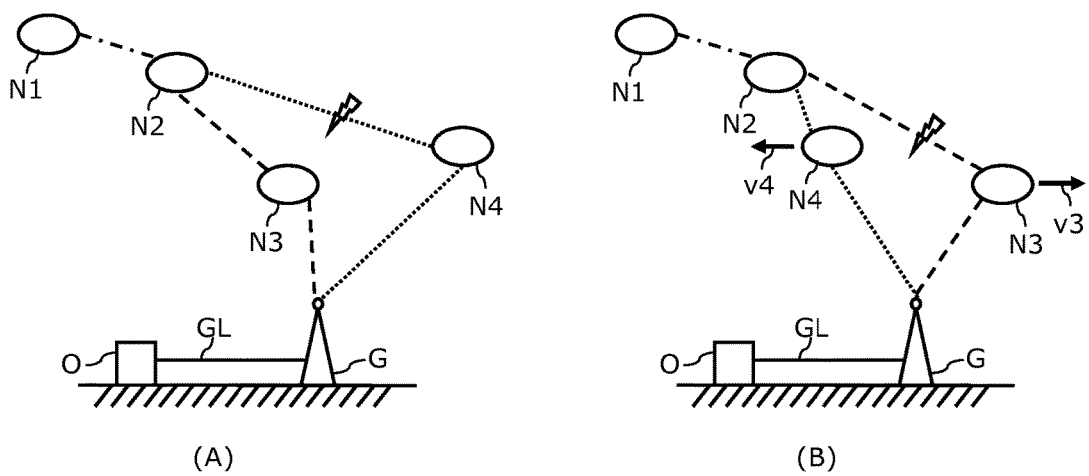
FIG. 2 schematically illustrates momentary network constellations in the wireless aircraft network of FIG. 1 according to another embodiment.

As shown in FIG. 2, two scenarios (A) and (B) may help in understanding, how the network operator station O may determine the most efficient paths in the ad-hoc aircraft network N of FIG. 1. Scenario (A) is a flight situation of airborne nodes N1 to N4 (corresponding to mobile nodes in aircraft, such as the aircraft A1, A2 in FIG. 1) that temporarily precedes the situation in scenario (B). Node N1 is to be connected to the ground station G. The network operator station O determines that N2 as neighboring node to node N1 may provide from the first routing node. In scenario (A) node N3 is located nearer to node N2 and next to the ground station G, thus lending itself to an intermediate node between the node N2 and the ground station G. Node N4 is further away than node N3, thus being disregarded in determining the most efficient network routing path between node N1 and ground station G. Thus, the operator station O may provide node N1 with the determined route discovery information and node N1 connects to the ground station G via nodes N2 and N3. Nodes N2 and N3 as part of the ad-hoc network are also informed about the route discovery information and are able to route communication items from node N1 along the predetermined network route.

In scenario (B), after a certain period of time has lapsed since scenario (A), the mobile nodes N1 to N4 may have moved in different directions. In order simplify the explanation, only nodes N3 and N4 are assumed to have moved in the directions v3 and v4, respectively. Node N4 has moved closer to node N2 and/or the ground station G, while node N3 may have moved further away or even completely out of range of node N2. Thus, the operator station O re-determines the most efficient path between node N1 and the ground station G as leading over nodes N2 and N4. The updated determination result is provided as route discovery information, i.e. as information about the current dynamic network topology to all participating nodes, so that node N1 may now route its communication over nodes N2 and N4 to ground station G.

The transceiving devices on board of the aircraft capable of participating in ad-hoc networks may be implemented as integrated lighting/antenna units, i.e. existing external lights and/or beacons may be enhanced in their functionality by integrating the necessary wireless antenna or optical transmission/receiving functions. If radio communication antenna systems are built into the existing aircraft lights and/or beacons, additional external antennae may be avoided, thus obviating the creation of additional unwanted drag associated with such antennae. Data transmission to the integrated light/antenna units may be delivered over existing power wiring for the external lights via data over power technology. The communication signals may be digitally encoded within the airframe, coupled to the lighting power feeder lines and then converted to emission signals in the aircraft lights and/or beacons before transmitting them onward to the integrated antenna system for transmission to the outside. Similarly, reception of communication signals may be performed by the integrated antenna systems as well, with the demodulation and deciphering of the communication signals being performed in the aircraft lights and/or beacons.

Figure 3:
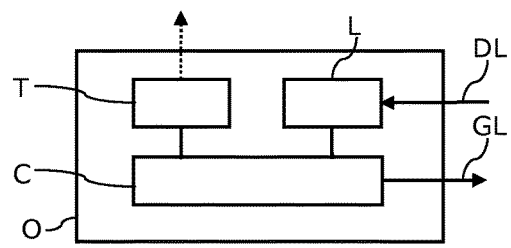
FIG. 3 schematically illustrates a network operator station for an aircraft ad-hoc network according to another embodiment.

FIG. 3 exemplarily depicts a functional block diagram of a network operator station O for an aircraft ad-hoc network, such as the network N shown and explained in conjunction with FIGS. 1 and 2. The network operator station O comprises a location management module L and a control module C coupled to the location management module L. Moreover, the network operator station O may comprise a transceiver module T configured to wirelessly transmit information to nearby transceivers.

The location management module L is configured to receive location data DL regarding the current geographical location of a plurality of aircraft and to update a location data table according to the received location data DL. The location data DL may for example be provided by a central aviation authority or agency. Alternatively or additionally, the location data DL may be collected by the participating aircraft individually. The location data DL may also be calculated in advance depending on planned or predicted flight path information from the respective aircraft operators.

The control module C is configured to read out the current geographical locations of the plurality of aircraft from the location data table and to determine a most efficient path for each of the plurality of aircraft to one of a plurality of ground-based network stations. This determination may depend on the read out current geographical locations of the plurality of aircraft as well as the geographical locations of the plurality of ground-based network stations. The determined most efficient paths are used to build up a current dynamically changing network topology and may be to each of the plurality of aircraft as route discovery information for the aircraft ad-hoc network N.

The determination of the network topology, i.e. the most efficient paths in the ad-hoc network in its current state may be performed according to diverse routing protocols. Those routing protocols may for example be spanning tree, or generally Dijkstra-algorithm based protocols. The control module C may for example operate according to the location-aided routing protocol (LAR), the optimized link state routing protocol (OLSR), the ad-hoc on demand distance vector routing protocol (AODV), the temporally-ordered routing algorithm (TORA), or the zone routing protocol (ZRP).

The network operator station O is furthermore connectable to one or more ground stations G via a wirebound ground link GL. The control module C may provide the determined most efficient paths, i.e. the current network topology to one or more ground stations G as route discovery information for the aircraft ad-hoc network N as well.

Figure 4:
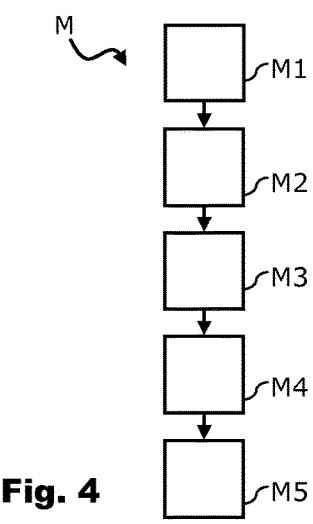
FIG. 4 schematically illustrates a method for wirelessly connecting aircraft according to a further embodiment.

FIG. 4 exemplarily illustrates a block diagram of a method M for wirelessly connecting aircraft, in particular using a wireless aircraft network N as illustrated in conjunction with FIGS. 1 and 2. The method M may further utilize a network operator station for an aircraft ad-hoc network, such as the network operator station O as illustrated and explained in conjunction with FIG. 3. The method M may comprise at M1 receiving location data DL regarding the current geographical location of a plurality of aircraft in a network operator station O. The network operator station O may include a location data table which is updated at M2 according to the received location data DL.

In periodic intervals, the network operator station O may read out the current geographical locations of the plurality of aircraft from the location data table at M3 in order to determine a most efficient path for each of the plurality of aircraft to one of a plurality of ground-based network stations depending on the read out current geographical locations of the plurality of aircraft and the geographical locations of the plurality of ground-based network stations. To that end, the method may employ the location-aided routing protocol, LAR, the optimized link state routing protocol, OLSR, the ad-hoc on demand distance vector routing protocol, AODV, the temporally-ordered routing algorithm, TORA, or the zone routing protocol, ZRP.

At M4, the determined most efficient paths may be provided to each of the plurality of aircraft as route discovery information for forming an aircraft ad-hoc network N. Consequently, using the provided route discovery information the plurality of aircraft may connect to each other at M5 in an aircraft ad-hoc network N.

The method M provides a solution for in-flight broadband communication over areas where no ground stations are available, i.e. so-called "black hole" areas. The ability to implement a self-organizing ad-hoc network with redundant communication links improves network robustness and availability, in particular since the bandwidth increases with the number of aircraft participating in the ad-hoc network, thereby providing excellent scaling capabilities.

The aircraft ad-hoc network may be implemented with a globally available aeronautical frequency band for communication without major interference from other sources. Dense air traffic over oceans and/or areas with no adequate ground-based communication systems may provide for communications bridges to support aircraft without directly available Air-to-Ground Communications (DA2GC). Air-to-Air (A2A) Communications may be offloaded through neighboring aircraft. Moreover, the inter-aircraft communication may be strengthened as well.

When taking into account seaborne vessels with broadband connectivity, the availability of ad-hoc network routing options may be even further enhanced: Air-to-Vessel (A2V) Communications may conveniently be used to offload the aircraft traffic to a ground system through vessels (and vice versa). The proposed ad-hoc network implementation may be mandatorily installed on all in-service and newly built ETOPS certified aircraft.

The transmission of aircraft related communication items may be scheduled depending on the provided route discovery information. For example, if it is determined that there is currently no path between one of the plurality of aircraft and one of the ground-based network stations, the transmission of aircraft related communication items may be scheduled to be withheld until it is determined that a path between the respective aircraft and the respective ground-based network station is available. This provides for a good opportunity to use satellite-based communication only for higher priority data communication, while lower priority data communication, such as in-flight entertainment services, may be conveyed less expensively over the ad-hoc network, as it becomes available temporarily.

Mission-critical aircraft related communication items may, on the other hand, be scheduled to be performed over satellite communication, if it is determined that there is currently no path between one of the plurality of aircraft and one of the ground-based network stations. This pertains predominantly to primary data content, such as black box flight recorder information. Those data items need to be continuously streamed for safety reasons, therefor higher communication costs via satellite communication may be put up with, if the ad-hoc network capability of the aircraft is currently limited.

Whenever the ad-hoc network is available, data may be streamed continuously with low costs and high quality of service in terms of bandwidth, latency and availability. The data may be encrypted and packaged to ensure privacy between aircraft of competitor airlines taking part in the ad-hoc network. The whole infrastructure on board of an aircraft is based on very light onboard system infrastructure with little or no weight and/or drag penalty. The ad-hoc network may connect the aircraft with ground stations at all flight phases: at the airport, during ground movements (Taxi), as well as during flight over land, oceans and deserts. In general, ad-hoc networks according to the various aspects of the invention provide real-time tracking and monitoring capabilities for mobile vehicles.

The determination of the most efficient network paths in the sense of the present invention includes the determination based on different criteria pertaining to the quality of service, the latency, the available bandwidth, the costs, the number of intermediate nodes, the averaged package drop rate and other parameters possibly influencing communication over the network paths.

Amongst the different services possibly being enhanced by the proposed ad-hoc network approach are: air-ground/ground-air telematics, information about system performance and/or BITE streamed to ground, crew performance streamed to ground, local air data sharing between aircraft on similar flight paths, "Lost aircraft" tracking via adjacent aircraft, internal cabin camera data streamed to ground, real-time tracking on ground of in-flight purchases to yield trend analyses, logistics for re-stocking trolleys and so on, support for telemedicine, formation flight synchronisation between formation members, baggage tracking, containerised freight status, for example airborne coolchain data, cabin microphone streaming to ground for performance profiling.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wireless aircraft network, comprising:
   a plurality of aircrafts having transceiver devices for transceiving wireless communication;
   a plurality of ground-based network stations having transceiver devices for transceiving wireless communication; and
   a network operator station configured to store location data regarding the current geographical location of the plurality of aircrafts in a location data table of the network operator station and to determine a most efficient network path for each of the plurality of aircrafts to one of the plurality of ground-based network stations depending on the current geographical location of the plurality of aircraft and the geographical location of the plurality of ground-based network stations,
   wherein the network operator station is further configured to build up a current dynamically changing network topology from the determined most efficient paths and to provide the determined most efficient paths to each of the plurality of aircrafts as route discovery information.

2. The wireless aircraft network according to claim 1, wherein the plurality of aircrafts is configured to connect to other aircraft and/or the plurality of ground-based network stations according to the provided route discovery information.

3. The wireless aircraft network according to claim 1, further comprising:
   one or more satellites configured to provide satellite communication between the plurality of aircrafts and the ground-based network stations.

4. The wireless aircraft network according to claim 1, wherein the ground-based network stations comprise one or more seaborne vessels.

5. A method for wirelessly connecting aircraft, comprising:
receiving location data regarding the current geographical location of a plurality of aircrafts in a network operator station;
updating a location data table of the network operator station according to the received location data;
reading out the current geographical locations of the plurality of aircrafts from the location data table and determining a most efficient path for each of the plurality of aircrafts to one of a plurality of ground-based network stations depending on the read out current geographical locations of the plurality of aircrafts and the geographical locations of the plurality of ground-based network stations in the network operator station;
building up a current dynamically changing network topology from the determined most efficient paths;
providing the determined most efficient paths to each of the plurality of aircrafts as route discovery information for an aircraft ad-hoc network; and
connecting one or more of the plurality of aircrafts in an aircraft ad-hoc network according to the provided route discovery information.

6. The method according to claim 5, further comprising:
scheduling the transmission of aircraft related communication items depending on the provided route discovery information.

7. The method according to claim 6, wherein, if it is determined that there is currently no path between one of the plurality of aircrafts and one of the ground-based network stations, the transmission of aircraft related communication items is scheduled to be withheld until it is determined that a path between the respective aircraft and the respective ground-based network station is available.

8. The method according to claim 6, wherein, if it is determined that there is currently no path between one of the plurality of aircrafts and one of the ground-based network stations, only transmission of mission-critical aircraft related communication items is scheduled to be performed over satellite communication.

9. A network operator station for an aircraft ad-hoc network, the operator station comprising:
a location management module configured to receive location data regarding the current geographical location of a plurality of aircrafts and to update a location data table according to the received location data; and
a control module configured to read out the current geographical locations of the plurality of aircrafts from the location data table, to determine a most efficient path for each of the plurality of aircrafts to one of a plurality of ground-based network stations depending on the read out current geographical locations of the plurality of aircrafts and the geographical locations of the plurality of ground-based network stations, to build up a current dynamically changing network topology from the determined most efficient paths and to provide the determined most efficient paths to each of the plurality of aircrafts as route discovery information for the aircraft ad-hoc network.

10. The network operator station according to claim 9, wherein the network operator station is configured to determine and provide the most efficient paths according to the location-aided routing protocol (LAR), the optimized link state routing protocol (OLSR), the ad-hoc on demand distance vector routing protocol (AODV), the temporally-ordered routing algorithm (TORA), or the zone routing protocol (ZRP).

11. The network operator station according to claim 9, further comprising:
a transceiver module configured to wirelessly transmit the route discovery information to one or more of the plurality of aircrafts.

12. The network operator station according to claim 9, wherein the network operator station is connectable to one or more ground stations via a wirebound ground link, and wherein the control module is configured to provide the determined most efficient paths to the one or more ground stations as route discovery information for the aircraft ad-hoc network.

* * * * *